United States Patent [19]

Schulz et al.

[11] Patent Number: 4,464,674

[45] Date of Patent: Aug. 7, 1984

[54] METHOD AND APPARATUS FOR CONCEALING ERRORS IN A DIGITAL TELEVISION SIGNAL

[75] Inventors: Axel Schulz, Bickenbach; Werner Staude, Reinheim, both of Fed. Rep. of Germany

[73] Assignee: Robert Bosch GmbH, Stuttgart, Fed. Rep. of Germany

[21] Appl. No.: 366,936

[22] Filed: Apr. 9, 1982

[30] Foreign Application Priority Data

Apr. 30, 1981 [DE] Fed. Rep. of Germany ....... 3117206

[51] Int. Cl.$^3$ ............................................. H04N 9/535
[52] U.S. Cl. ................................. 358/21 R; 358/163; 358/314; 358/327
[58] Field of Search ............. 358/314, 327, 163, 21 R; 360/38.1

[56] References Cited

U.S. PATENT DOCUMENTS 4,376,955 3/1983 Reitmeier ........................... 360/38.1

OTHER PUBLICATIONS

"Digital Television Error Correction Without Overheadbits", *Television Technology in the* 80's, A. A. Goldberg & J. P. Rossi, 1981, pp. 80-88.

*Primary Examiner*—Richard Murray
*Attorney, Agent, or Firm*—Frishauf, Holtz, Goodman & Woodward

[57] ABSTRACT

The digital signals representing successive picture points of a digital television video signal is caused to pass through, in succession, two delay circuits each providing a delay of one television line interval. This makes three places available where shift registers may be connected for stepping the digital signals at picture point intervals, so that a two-dimensional array of neighboring picture points located on adjacent portions of three television lines can be made simultaneously available for correcting the signal of the central picture point if it is found to be defective. A defective picture point is caused to be represented by a null value of digital signals by an error-correcting circuit. Thus, at the same places where the video signal shift registers are connected, gates for detecting null signals may be connected, each of which is followed by one-bit shift registers for addressing a read-only memory for controlling the choice of digital signal pairs from the picture point array which will be averaged in an averaging circuit to provide the output signal. If the digital signal of the central point of the picture point array is not defective, duplicates of this signal are provided to the averaging circuit under control of the read-only memory so that the original signal will proceed to the output of the circuit. If this signal is defective, however, the read-only memory selects a pair of signals corresponding to picture points bracketing the central point to provide the average signal, in accordance with a program that takes account of which points in the picture point array are defective. If no bracketing pair of points provides nondefective signals, the memory causes a medium gray signal to be substituted for the defective center point signal. This system has the advantage that the same stages are used and the same operating times occur in the processing of every picture point, whether the signal for that point is defective or not.

10 Claims, 3 Drawing Figures

```
        1 2 3 4 5 6 7
n - 1   o o o o o o o
  n     o o o o x o o o
n + 1   o o o o o o o o
```

METHOD AND APPARATUS FOR CONCEALING ERRORS IN A DIGITAL TELEVISION SIGNAL

This invention concerns a method of concealing errors in a digital television video signal, particularly in the case of a color television signal by concealing errors in each of the three sequences of digital video signals respectively corresponding to the three video components of a color television signal.

One method for concealing errors of video signals is known from the periodical "BBC Research Report" 1976/1, February '76, pp. 1–7, in particular page 1, section 2. This known method applies to errors in a digital color television signal encoded in a so-called "closed" code. As a result of the closed coding, only integral picture points relative to the color carrier oscillations can be taken account of for derivation of the picture points to be inserted in the place of defective picture points. A further disadvantage is that the correlation in time for derivation is troublesome because of different operating times for the derivation when neighboring picture points are also defective or disturbed.

An improved method for concealing errors in digital video signals is disclosed in the copending U.S. patent application, owned by the assignee of the present application, Ser. No. 357,619, filed Mar. 12, 1982, in which the color information and the luminance information are separately coded, in contrast to the "closed" code above referred to, but the system there disclosed also has the disadvantage of different operating time for the derivation of picture point values to be substituted for a defective picture point when neighboring picture points as well as the primary picture point are defective.

THE INVENTION

It is an object of the present invention to provide a system of concealing errors in digital signals of each of the three video components of color television signals by substitution of values for defective picture points in which the operating time of the circuits for delivering the corrected video signals is the same whether or not the primary picture point is defective and whether or not, when the primary picture point is defective, one or more neighboring picture points are also defective. In particular it is an object of the invention that the video signals should in every case go through the same handling procedure, preferably an arithmetical averaging of two picture point values. It is a further object of the invention to provide a reliable apparatus for carrying out such a method.

Briefly, when the primary picture point is not defective, duplicate digital signals representing it are furnished to the same averaging circuit as is used for averaging neighboring picture points to furnish a corrected picture point signal when the primary picture point has been found to be defective. More particularly, conventional means are used for identifying defective picture points in each of the three component video signals, in digital form, of a color television signal and causing the value of the digital signal corresponding to a defective picture point to be a null value for designating the defective nature of the picture point represented. For every primary picture point in the usual television scanning sequence there are simultaneously presented the digital signals representative of the neighboring picture points by providing three streams of digital signals for each video component, respectively undelayed, delayed one television line and twice delayed by one television line, each of the three streams then being made available in stepwise delays of one picture point through shift registers. The three streams of picture points respectively undelayed, delayed by one television line and twice delayed by one television line are also used to produce a field of bits representing the defective or valid condition of the simultaneously presented picture points for addressing a read-only memory that in turn provides control signals selecting the digital picture point signals from those made simultaneously available, to be provided to the averaging circuit for delivery of the corrected digital video signal. Furthermore, the method is simultaneously performed in three separate processing channels on all three video signal components of a color television signal, namely the luminance component and the two color-difference components.

The system of the invention has the advantage of suppressing the different digital signal processing times inherent in the previously known systems. A further advantage is that the choice of the undisturbed neighboring picture points for derivation of a new picture point value to replace that of a defective picture point can be varied over a wide range. Thus, even picture points in the more remote neighborhood of a disturbed picture point can be resorted to. Furthermore, the order of priority in the choice of picture point pairs in the neighborhood of a defective primary picture point, based on the line of direction of a picture point pair can be set in any desired way and, furthermore, can be changed by replacing the read-only memory or reprogramming it without reconstructing the system if a basic change should be desirable.

THE DRAWINGS

The invention is further described by way of illustrative example with reference to the annexed drawings, in which FIG. 1 is a diagram showing picture points of a portion of a television picture field;

FIG. 2 is a block diagram of a circuit for processing picture point signals in accordance with the invention, and FIG. 3 is a block diagram of the portion of the circuit of FIG. 2 for providing the control signals applied to circuits 25, 27, 28, 30 and 33 of FIG. 2.

DESCRIPTION OF THE ILLUSTRATED EMBODIMENT

Figures 1, 3:
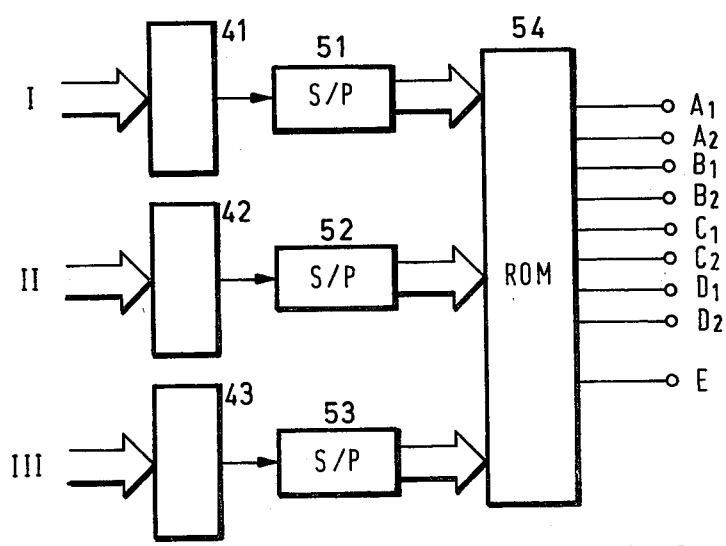

FIG. 1 shows a section of a television picture field composed of a number of picture points of three successively scanned lines of the picture at the center of which is a picture point designated with an X in the middle line which is to be regarded as the line currently being scanned. This line is designated n, whereas the preceding line is designated n−1 and the following line n+1. In the vertical direction the point raster can subdivided into columns of which there are nine in FIG. 1, the columns between the two end columns being numbered from 1 to 7 consecutively. The picture point designated X rather than by an open circle is assumed to be defective and it is defined in the representation of FIG. 1 by its position in the currently scanned line n and in the column 4. As the scanning proceeds along the line the pattern of FIG. 1 may be considered as moving to the right, with the central point not always being defective, however, and for the purposes of explanation the central point n,4 may be referred to as the primary picture point with respect to which the other point ranging from n−1,1 to n+1,7 are defined. This concept is valuable for understanding FIG. 2 which will be explained further below. The "primary" picture point n,4 may also be defined as the "point currently being processed," and picture point positions in FIG. 1 may be designated 1− instead of n-1, or 7+ instead of n+1,7 and simply 4 instead of n.

Proceding from the observation that disturbances which occur in the digital transmission and storage of television signals frequently involve more than one picture point, so that a simple average value formation drawing only upon points immediately adjacent to the disturbed picture point leads to unsatisfactory results, the system of the present invention has been developed in which not only picture points immediately adjacent to the disturbed picture point can be drawn into account for derivation of a substitution value. Thus, for example, a considerable number of picture points lying in the horizontal direction with respect to a disturbed picture point can be utilized in accordance with the following criteria:

When the primary picture point is defective, as shown by the X in FIG. 1, and when immediately to the left and right thereof in the currently scanned television line there are undisturbed portions of the picture field, an average value can readily be formed from the picture points to the left and right of the disturbance and substituted for the defective picture point value. If, however, for example the picture point immediately to the right of the defective point X is likewise disturbed, then an average value is produced with the point to the left of the disturbance X and the point ot the right of the further disturbance to the right of X, to provide a substitution value for the point X. If these two points also should be disturbed and therefore defective, adjoining undisturbed picture points in the horizontal direction can be drawn in for average value formation, and this substitution signal can be inserted at the place of the defective picture point X.

Detection of defective picture points in a digital color television signal is carried out in an error detector that is not shown in the drawing. Conventional error detectors of the kind used in the illustrated embodiment set the value of the defective picture point to a null (0) value when the occurence of an error in the representation of the picture point is detected. The constitution and operation of such error detectors is well-known and does not need to be described further here. The digital color television signals of each video component of a color television signal is represented in $2^8$ steps of value by an 8-bit signal and the setting of the null value in this scale as the signal value is in the present example reserved for the indication and recognition of the presence of a defective picture point. The scale range of the color television signal is thereby reduced by one value step. If this reduction of the value range should not be permissible in the digital color television signal, the presence of a disturbed picture point in the color television digital video signal could also be indicated over a separate signal conductor.

When it is found that within a picture line so many adjacently lying picture points are defective that a meaningful average value formation is not possible, because the undisturbed picture points to be drawn upon would then be so far from each other that they would represent parts of quite different picture contents, the picture points vertically adjacent to the disturbed picture points are used to form an average in the place of the defective picture point between them.

Figure 2:
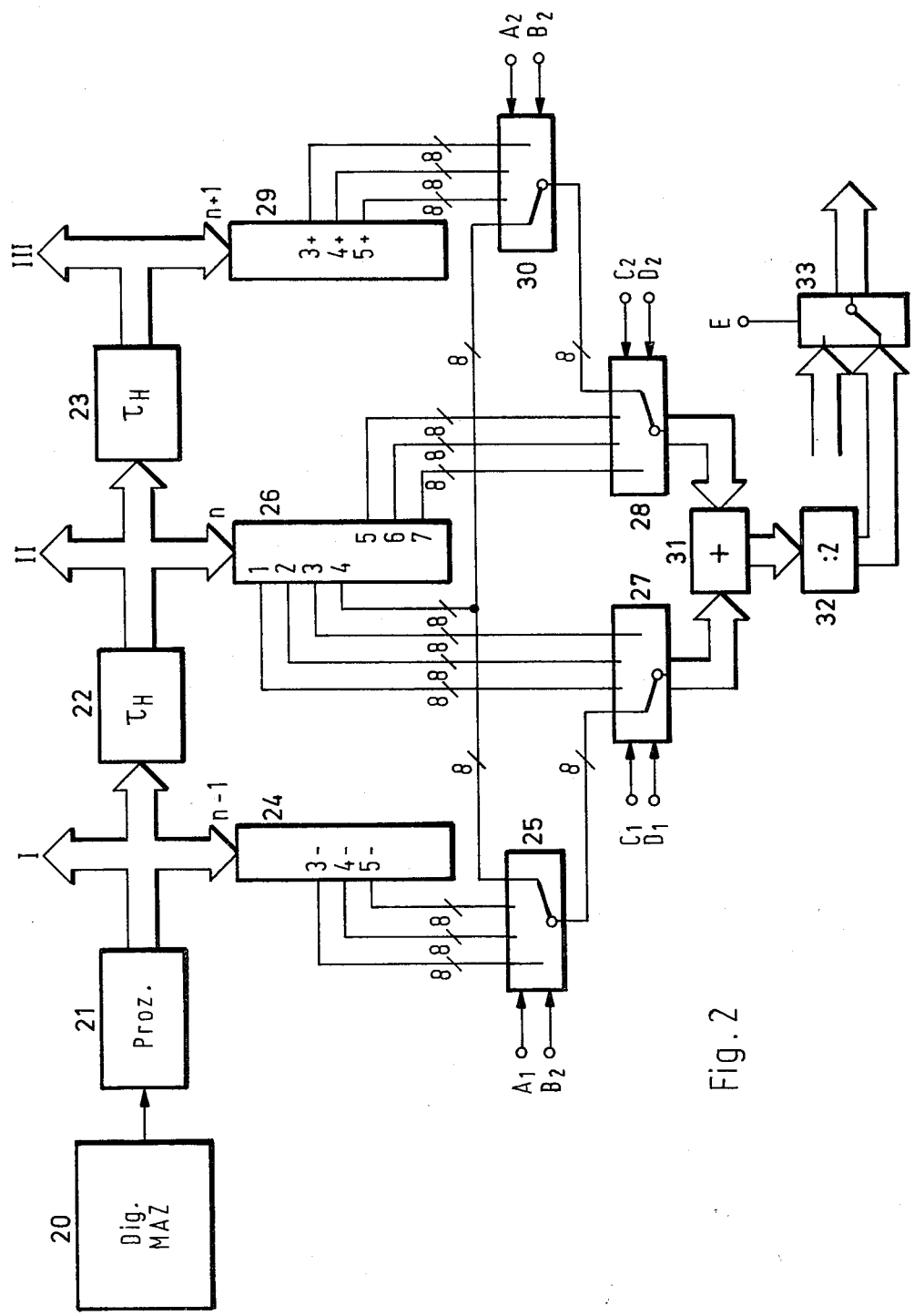

In the block diagram of a circuit according to the invention shown in FIG. 2 the source of digital signals is represented by a magnetic tape equipment 20 for storing digitally coded color television signals and supplying these signals to a processor 21 for preparation of the reproduced signals for picture reproduction. The digital signals are provided at the output of the processor 21 in parallel "bytes" which then are transmitted through two successive delay devices 22 and 23 in each of which they are delayed by one television line interval. The undelayed data signals which may be regarded as in a plane perpendicular to the drawing, designated in this case as the I-plane represent the picture points of the line designated n−1 in FIG. 1, preceding the line n containing the primary picture point 4 which is the picture point currently being processed. These undelayed signals are supplied to a first shift register 24 in which they are successively delayed by picture point intervals so that at three separate outputs the picture points 3−, 4− and 5− are simultaneously available and are supplied from there to three of the four inputs of the multiplexer 29.

After the data signals proceding from the processor 21 have passed through the first delay device 22, in which they are delayed by one television line interval, they may regarded as being in the II-plane, the time plane of the line n which contains the point 4 currently being processed. These signals are in turn supplied to a second shift register 26 which has seven outputs in all, between successive ones of which there is a delay of one picture point, so that at these outputs there are simultaneously available the signals of the picture points of the line n falling in the seven numbered columns of FIG. 1. The picture point currently being processed appears at the output 4 of the shift register 26, whereas the outputs 1, 2 and 3 of the shift register show the preceding picture points and the outputs 5, 6 and 7 the succeeding picture points of the same line. The outputs 1, 2 and 3 of the shift register 26 are supplied to three adjacent inputs of the four-input multiplexer 27, while the outputs 5, 6 and 7 of the same shift register are connected to three adjacent inputs of another four-input multiplexer 28.

From the signals in the II-plane there are provided after repetition of the one television line interval delay in a device 23, the picture signals of the III-plane, i.e. the picture point signals of the television line n+1 of FIG. 1. The data signals from this III-plane are supplied to a third shift register 29 where they are delayed stepwise by picture point intervals. It has outputs, at the middle one of which is the point 4+ (as the point n+1,4 can be designated) which is the point directly above the picture processed currently, while the other outputs of the shift register 29 make available the previous point 3+ and the following point 5+. The outputs of the shift register 29 are respectively connected to three of the four inputs of the multiplexer 30.

The signals from the output 4 of the shift register 26, which are the data signals belonging to the picture point currently being processed, are applied to the fourth input of the respective multiplexers 25 and 30, which are the inputs not connected to a shift register. The output of the multiplexer 25 is connected to the fourth input of the multiplexer 27 and the output of the multiplexer 30 to the fourth input of the multiplexer 28. The output signals of the multiplexer 27 are connected to one input of addition stage 31 which has a second input to which the output signals of the multiplexer 28 are supplied. At the output of the addition stage 31 there is connected a division stage with the division ratio 2. The output of the division stage 32 is connected with one input of the multiplexer 33 which has a second input to which the digital value of a medium gray signal is supplied continuously. The video signal with its errors concealed is available at the output of the multiplexer 33.

The circuit illustrated in block form in FIG. 3 shows the circuit logic for useful operation of the multiplexers 25, 27, 28, 30 and 33. The picture signals present in bit-parallel form at the planes I, II and II in FIG. 2 (as designated by the upwardly directed branch busses designated I, II and III in FIG. 2) are respectively supplied to the gates 41, 42 and 43. A serial-to-parallel converter 51 is connected to the output of the gate 41, a serial-to-parallel converter 52 to the output of the gate 42 and a serial-to-parallel converter 53 to the output of the gate 43. The outputs of the serial-to-parallel converters 51, 52 and 53 are connected to the address inputs of a read-only memory 54. The outputs of the read-only memory 54 are designated $A_1$, $A_2$, $B_1$, $B_2$, $C_1$, $C_2$, $D_1$, $D_2$ and E. These outputs are connected to the correspondingly designated control inputs of the multiplexers 25, 27, 28, 30 and 33 of FIG. 2 and are supplied with control signals in accordance with a program of which it is the purpose of the read-only memory 54 to store.

The control of the multiplexers is produced as shown in FIG. 3 according to the conditions specified by the contents of the read-only memory 54. The signals of the respective I, II and III planes after respectively passing through the gates 41, 42 and 43 are converted into a bit-parallel form and applied to the read-only memory 54 as addresses. According to the programming of the read-only memory 54 the proper signals are provided at the outputs $A_1$ to E for the control of the multiplexers 25, 27, 28, 30 and 33.

Since according to the preferred form of the invention a defective picture point is represented by a null value digital signal, the gates 41, 42 and 43 preferably are each constituted to perform an AND function, preferably the kind of AND function known as NAND, to provide a particular signal only when all the bits of the picture point digital signal are zeros, i.e. when the picture point represented is defective. The serial-to-parallel converters may be one-bit shift registers, the "lateral" outputs all of which produce an array of bits indicating the condition (defective or nondefective) picture point signals made available to multiplexers 27, 28, 30 and 31 by the registers 25, 26 and 29, the serial-to-parallel converter 51 thus providing three bits, the serial-to-parallel converter 52 providing seven bits and the serial-to-parallel converter 53 presenting three bits. The thirteen bits thus provided at any time to the ROM 54 thus provide a quasi 2-dimensional array of the quality of the various picture point signals and the read-only memory 54 is constituted to provide the appropriate control signals to the multiplexers of FIG. 2 for every possible combination of defective and nondefective picture points in this array of 15 points. The contents of the ROM 54 constitute a program for controlling the multiplexers of FIG. 2 which select the picture point signals to be averaged in the combination of stages 31 and 32 and also the substitution of a medium gray picture point value in the multiplexer switch 33 when no meaningful average can be provided through the stages 31 and 32 under control of the ROM 54. The most significant feature of the programming of the ROM 54 in accordance with the present invention is the operation of the multiplexers 25, 27, 28 and 30 in the positions shown in FIG. 2, supplying the value of the picture point obtained from the output 4 of shift register 26 to both of the inputs of the adding stage 31 whenever the picture point in question, the picture point then being processed, is not indicated to be defective. When that picture point is found to be defective, various priorities of picture point pairs straddling the primary picture point may be established in the programming of the ROM 54 so that the highest priority pair consisting of nondefective picture points will be used for the adding stage 31. If no picture point pair bracketing the picture point currently being processed consists of two nondefective picture points, the control signal over the output E will cause a medium gray picture point value to be provided for the output signal by operation of the multiplexer 33.

It requires only two bits to select an output from four inputs in the multiplexers 25, 27, 28 and 30 and it is evident, accordingly, how the bits provided at the outputs of the read-only memory 54 can control an appropriate selection of a picture point pair for the addition stage 31 for any given set of inputs to the ROM 54.

The multiplexer 33 merely selects an eight-bit signal from either of two inputs and is accordingly controllable by a single bit.

FIGS. 2 and 3 completely describe a circuit for one video component of a color television signal that is coded in a "separated" rather than in a "closed" code. In other words, FIGS. 2 and 3 show a complete channel for one component of the usual three video components of a color television signal. Each component of the color television video signal requires such a channel for processing the signal in accordance with the present invention.

The circuit of FIGS. 2 and 3 and the programming of the ROM 54 of FIG. 3 are of such a configuration that the digital video signal transmitted through the channel, even for undisturbed picture points, will always run through circuit paths of the same length, hence requiring the same operating time lapse in passing through the circuit. In undisturbed operation, with no defective picture point signals, the averaging circuit 31, 32 continues in operation all the while. The signal take off at the output 4 of the shift register 26 provides the original picture point signal for the picture point currently being processed. That output signal is always distributed to one input of each of the multiplexers 25 and 30. In normal operation that signal runs from the output of these two multiplexers and then through the two multiplexers 27 and 28 to be added in the addition stage 31. Then, by division by the divisor 2 there is provided at the output of the division stage 32 again the signal taken from the shift register 26 at its output 4, now, after the processing just described, to be presented at the output of the entire circuit.

When the picture point currently being processed is recognized as defective, the various multiplexers schematically shown in FIG. 2 are shifted from the respective positions shown in FIG. 2 by the ROM 54 of FIG. 3 acting on the control inputs the multiplexers. For example, the ROM 54 may be programmed for a first choice of points 3 and 5 in the line n, in which case the output of the multiplexer 27 is switched away from the output of the multiplexer 25 and over to the output 3 of the shift register 26 while the output of the multiplexer 28 is shifted away from the output of the multiplexer 30 over to the output 5 of the shift register 26, thus to feed the signals of the outputs 3 and 5 of the shift register 26 to the addition stage 31 for forming an average value, still, that result will not occur if an error in the picture points 3 and 5 on line n detected by the error recognition circuit not shown in the drawings (in the case of such an error being recognized the ROM 54 would operate the multiplexers to provide a different pair of points to the addition stage 31).

The division stage 2 divides the addition result to form the average value of the digital values supplied to the addition stage 31. In the case just mentioned of the digital values at the outputs 3 and 5 of the shift register 26 an average value is reached that approximates to a great degree of probability the value of the picture point represented by the defective picture point signal currently being processed.

If it is recognized by the unshown error detection circuit that the digitally coded signal at the output 3 of the multiplexer 26 is also unusable, the output of the multiplexer 7 will be switched to the output 2 of the shift register 26 unless this signal also is recognized as defective, in which case it will be shifted to the output 1 of the shift register 26 if the signal at that output is nondefective. In a similar manner, in the event of a defective signal at the output 5 of the shift register 26, the output of the multiplexer 28 will be shifted to the output 6, unless the signal at that output is defective, in which case the output of the multiplexer 28 is switched over to the output 7 of the shift register 26 if the latter is nondefective. Thus, an average value can be formed from the signals of the outputs 1 and 7 in the manner described above in the event that all the intervening picture points are represented by defective digital signals.

If it is recognized by the error recognition circuit that the signals at all of the outputs 1–7 of the shift register 26 are unsuitable for forming a substitute signal, the outputs of the multiplexers 27 and 28 are connected to the outputs of the multiplexers 25 and 30 as shown in FIG. 2 just as in the case of a nondefective picture point signal at the output 4 of the shift register 26, but now the multiplexers 25 and 30 are shifted away from their connection illustrated in FIG. 2 under control of the read-only memory 54, preferably to the respective middle outputs of the shift registers 24 and 29 to find the values of the picture points above and below the defective picture point currently being processed, i.e. points in the preceding and following lines and in the same column as the picture point currently being processed. An average value is formed to provide an output in the same way as described before. If, however, it is determined by the unshown error detector that a useable average cannot be formed from the picture point signals as mentioned, the multiplexers 25 and 30 will be controlled instead to use one of the pairs of diagonally neighboring picture points 3−, 5+ in one case and 5−, 3+ in the other case (see FIG. 1) for producing an average value, as it may be chosen to program the ROM 54.

If it is not possible to provide a useful average value by any pair of picture points represented at a pair of outputs of the array of shift registers which point pair bridges the picture point currently being processed, whether the point pair is horizontally, vertically or diagonally disposed, the ROM 54 is programmed to provide a control signal at its output E to cause a medium gray value to be connected through the multiplexers 33 to the output of that multiplexer.

It is a distinctive feature and advantage of the present invention compared to the previously known circuits for concealing errors in digital television signals, that even the signals representing undisturbed picture points currently being processed run through the circuit and and all are treated in the same manner, so that timing problems are avoided.

There is the further advantage that with simple changing of the program contained in the ROM 54 the formation of averages in the case of the defective picture points currently being processed can follow a different order of priority with respect to the direction of the line between neighboring picture points that bridges the point currently under process. Thus, it is also possible to assign the highest priority to a vertical pair of neighboring picture points, then diagonal picture point pairs and thereafter horizontally disposed picture point pairs for forming average value of undisturbed picture point pairs bracketing the picture point currently being processed when the latter is represented by a defective picture point signal.

When the picture point currently processed is at or near the end of the line, the field of picture points near the point currently processed loses symmetry. The shift registers may then be caused to insert null picture point values for nonexistent picture points beyond the picture edge.

Furthermore, at the beginning and end of the picture the nonexistent one or two lines preceding the first line and following the last line are automatically represented by supplementary defective picture points as the result of the absence of digital signals at the shift register inputs, temporarily confining the forming of averages to the use of horizontally disposed pairs of picture points in the case of the illustrated example.

Although the invention has been described with reference to a particular illustrative example, it will be understood that modifications and variations are possible within the inventive concept.

Reference is made to A. A. Goldberg and J. P. Rossi: "Digital Television Error Correction Without Overhead Bits", in a collection of papers of the SMPTE, entitled "Television Technologie in the 80's", 1981, p. 80–88, for description of a circuit for detecting and marking errors in color television digital video signals.

We claim:

1. Method of concealing defective picture points of television signals which includes making digital signals, separately for each of the three video components of color television signals, of picture points surrounding, so far as possibile, each picture point successively processed by the method, and substituting an average of values of nondefective picture points bracketing the picture point currently processed, by the use of averaging circuit means, in the event the digital signal of the latter picture point is determined to be defective, said method incorporating, in accordance with the invention, the step of furnishing the picture point value of the picture point currently processed, when the digital signal of the latter picture point is nondefective, to both inputs of the same averaging circuit means that is used to average values of bracketing picture points when the picture point currently being processed is found to be defective.

2. Method as defined in claim 1 in which the picture point value of the picture point currently being processed is furnished to both inputs of said averaging circuit means through the same picture point selecting circuits used for furnishing other picture point signals to said averaging circuit means.

3. Apparatus for processing a sequence of digital signals representing picture points of a television picture progressively scanned in a succession of lines for each picture field scan for use with means for examining each digital signal and identifying which of them contain errors requiring them to be replaced by substitute signals, said processing apparatus comprising, for the separately coded digital signals of each of the three video components of a color television signal:

signal delay means (22,23,24,26,29,51,52,53) for simultaneously making available respectively at outputs thereof the digital signals representing a two-dimensional array of neighboring picture points of said television picture points of said television picture and for likewise making a corresponding array of indications whether the corresponding picture point digital signals are defective or valid;

signal averaging means (31,32) having two signal inputs and an average signal output, and means (54,25,27,28,30) for applying digital signals to said inputs of said signal averaging means under control, for the selection of signals applied to said inputs, in response to the configuration of said array of indications of defectiveness or validity of signals available for selection, said signal applying means being constituted to apply duplicates of a primary digital signal representative of a picture point (4) having a predetermined position at or near the middle of said array of picture points whenever no error in said primary digital signal is detected by said digital signal examining and identifying means, and to apply signals respectively representative of picture points bracketing said primary digital signal when an error in said primary signal is detected.

4. Apparatus as defined in claim 3 in which said signal applying means comprises a control signal programming memory for providing control signals on a multiplicity of connections in response to the configuration of said array of indications of defectiveness or validity and multiplex signal selector means controlled by said control signal connections of said memory for selecting a pair of digital signals for application to said averaging means.

5. Apparatus as defined in claim 4 in which said averaging means comprises a signal addition stage and a scale of two divider stage operating on the output of said addition stage.

6. Apparatus as defined in claim 4 in which a signal selection circuit (33) is provided having a first signal input connected to the output of said signal averaging means and a second signal input connected permanently to a signal representative of a medium gray picture point value, said memory (54) having one control connection for operating to shift the output of said signal selection circuit from said first to said second signal input thereof whenever said primary signal has been found defective while at least one signal of each signal pair representing picture points bracketing said picture point represented by said primary signal have also been found defective.

7. Apparatus as defined in claim 3, 4, 5 or 6 in which said sequence of digital signals representing picture points is provided in bit-parallel fashion in succession to at least two units (22,23) each of which provides a delay of one television line interval to signals passing therethrough from input to output, and in which at the input of the first of said successive delay providing units, at each junction of said successive delay providing units and at the output of the last of said successive units, the respective inputs of shift registers (25,26,29) are connected, said registers having lateral outputs for making available for selection, by said signal applying means, the digital signals corresponding to said array of neighboring picture points as the points of said array are progressively changed in step with the arrival of digital signals supplied to the first of said delay providing units.

8. Apparatus as defined in claim 7 for use with signal examining and identifying means which operates by setting at null value all digital signals found to be defective, said apparatus having null value detecting gates (41-43) provided at the input of said first delaying unit, at the junctions between successive delaying units and at the output of the last of said delaying units and also serial to parallel converters for presenting in parallel the gate outputs provided by digital signals corresponding to picture points of said array of picture points for addressing said read-only memory.

9. Apparatus as defined in claim 8 in which said successive delay-providing units are two in number.

10. Apparatus as defined in claim 7 in which said successive delay-providing units are two in number.

* * * * *